Figure 3:
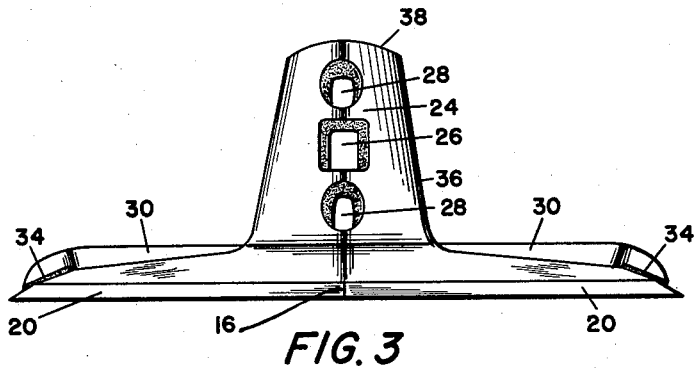

Oct. 13, 1964  R. L. ARNOLD  3,152,649
PLOW
Filed Dec. 18, 1962  2 Sheets-Sheet 1
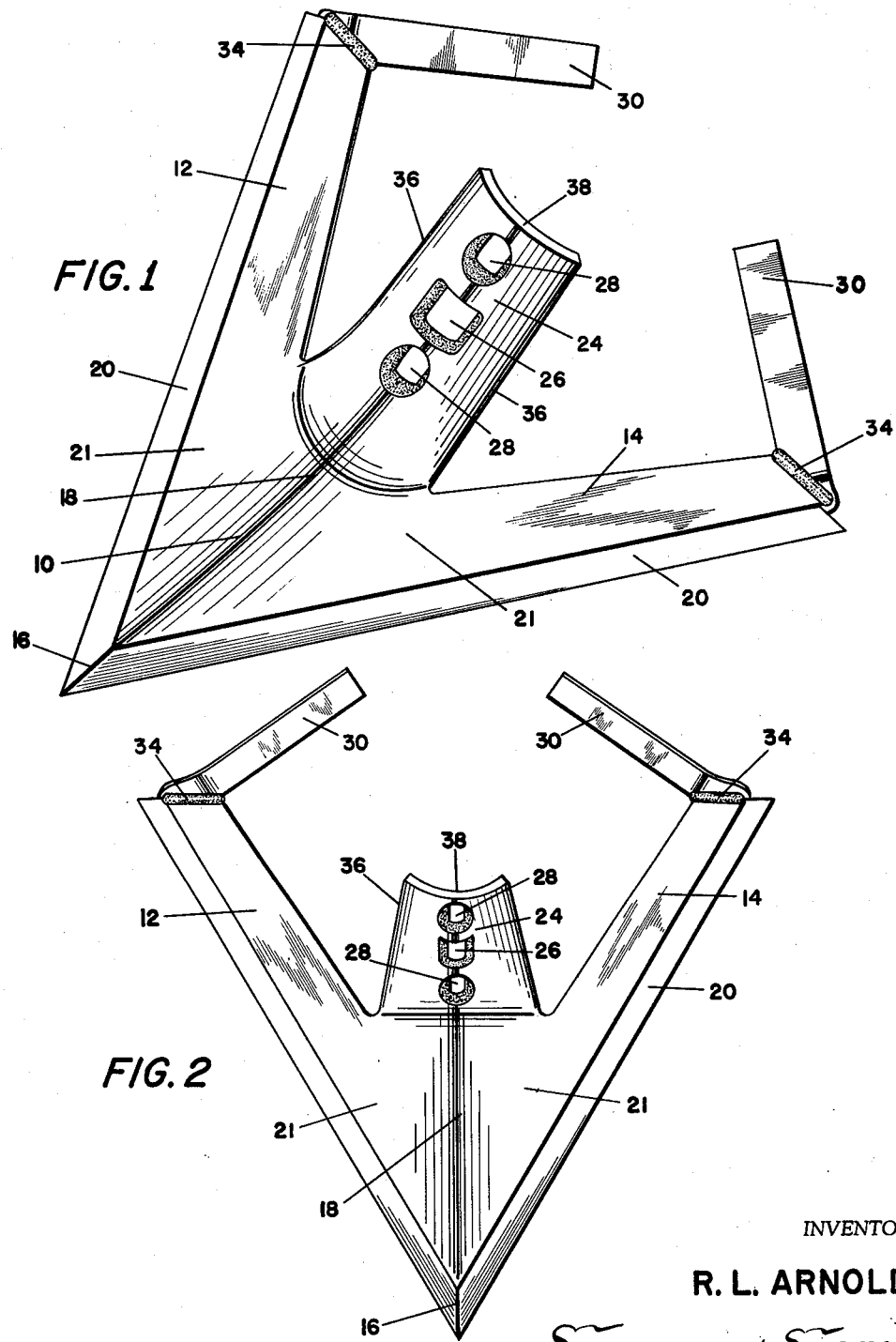
INVENTOR
R. L. ARNOLD
BY Semmes and Semmes
ATTORNEYS

United States Patent Office 3,152,649
Patented Oct. 13, 1964

3,152,649
PLOW
R. L. Arnold, Tunica, Miss., assignor to Crop-Maker, Inc., Tunica, Miss., a corporation of Mississippi
Filed Dec. 18, 1962, Ser. No. 245,511
1 Claim. (Cl. 172—730)

The present application relates to a sweep or plow, particularly a shallow draft V-plow of the pre-emergent type having means for reworking the earth turned by said plow.

Many earlier inventors have attacked the problem of enhancing the sweep of a plow through the earth in order that the earth may be more finely pulverized or worked. Normally, contrivances for this purpose have been applied to middle bursting plows having mold boards capable of deep penetration within the earth. Noteworthy in this respect are Langdon Patent No. 2,689 and Baird Patent No. 384,110. In the simpler prior art devices the reworking means have consisted of vertically extending vanes longitudinally aligned with the direction of travel of the plow. In other devices, a series of rearwardly extending pulverizer ribs have been attached to the elaborate support structures positioned adjacent the mold boards of the plow. These pulverizer ribs for the most part have also been aligned with the direction of travel of the plow. Principal shortcomings of these devices have been their relative complexity, high cost of construction, and maintenance; as well as the requirement for repetitive readjustment of the pulverizer ribs. Significantly, none of the devices have included pulverizer ribs which were capable of totally reworking the earth lifted by the plow.

In modern cultivation wherein there is required a reworking of the middle between the pre-emerge bands particular problems have arisen. It is necessary that the pre-emergent cultivator disturb the earth as little as possible in order that the later harvester equipment is not impeded in its highspeed travel. This has been accomplished with shallow draft sweeps. Normally, such shallow sweeps cut only a quarter or a half-inch below the surface of the middles a shortcoming of shallow draft sweeps, therefore, is that the soil so worked returns immediately to its previous position. A rain early after such plowing can result in the revitalization of a great part of the weed roots. Thus, the problem has been to develop a shallow sweep, together with a means for reworking the earth turned by the sweep so that the weed roots are exposed to the sun and killed.

The present invention consists of a shallow sweep in combination with two converging mulch wings, extending inwardly and rearwardly of the open ends of the sweep and being rearwardly inclined with respect to the direction of travel of the sweep. These converging mulch wings, together with the vertically extending connection shank extend above substantially the entire lateral plane of attack of the sweep, with the consequent result that the middle is readily reworked notwithstanding the shallow cut of the sweep itself.

Accordingly, it is an object of invention to provide a plow having means for reworking the earth being plowed.

Another object of invention is to provide in a shallow draft plow mulch wing extension.

Yet, another object is to provide in a shallow draft plow means for reworking earth throughout the entire lateral plane of attack of the plow.

Figure 4:
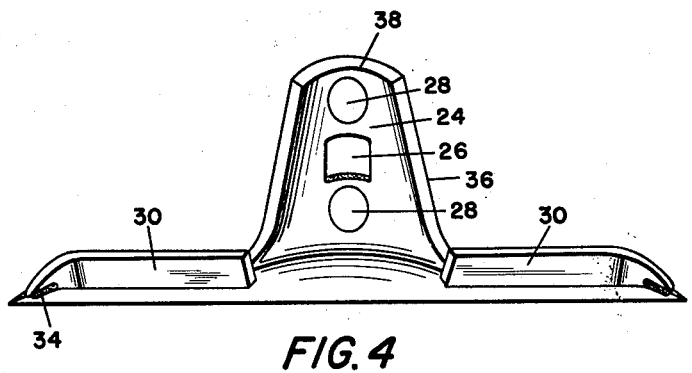
Figure 5:
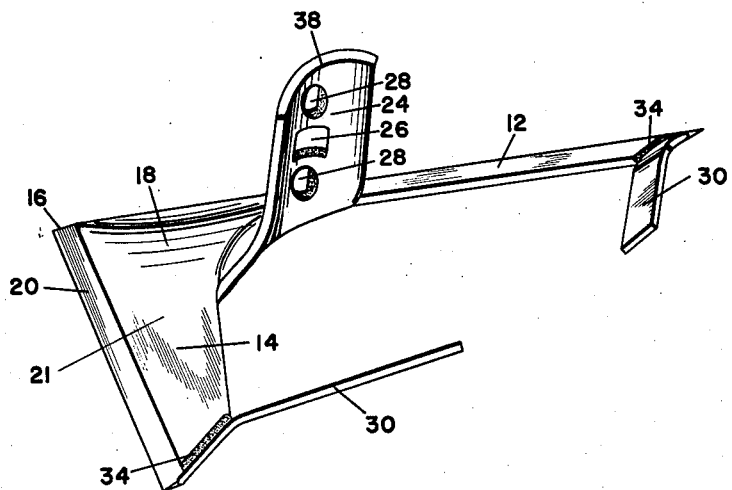

Yet additional objects of invention will become apparent from the ensuing specification and attached drawings wherein:

FIG. 1 is a perspective view of the plow;
FIG. 2 is a top plan thereof;
FIG. 3 is a front elevation;
FIG. 4 is a rear elevation; and
FIG. 5 is a side elevation of the plow.

In FIG. 1 there is illustrated a shallow draft pre-emergent sweep or plow 10 of the type employed in a cultivator tool gang, with or without other implements which may be used in the working of a plurality of rows between the crops, as well as the crop rows. Sweep 10 is comprised of rearwardly diverging wings 12 and 14 joined at their forward ends so as to define a leading edge apex 16. Although apex 16 may be slightly curvilinear in cross section there is defined a substantially flat lifting surface 18 which together with the flat surfaces 21 of the diverging wing extensions constitute the major lifting area of the plow. Each of the wings 12 and 14 may be provided with a lower cutting edge 20, the entire V-profile of edge 20 defining in top plan the plane of lateral attack of the plow. A central fastening or connection shank 24, having sides 36 and top 39, may be integrally formed with the juncture of the wings, extending vertically of surface 18 for attachment to a tool bar gang foot. Shank 24 may be curvilinearly formed as indicated at 38 and may embody apertures 28 for registry with corresponding studs on the foot, as well as a securing bolt aperture 26.

Respective converging mulch wings 30 may be secured to the open or free ends of the diverging wings by welds 34, or bolts as may be preferred. The individual converging wings 30, as illustrated in FIG. 5 are inclined rearwardly with respect to the direction of travel of the plow. As will be apparent, the wings 30 and 32 are presented inwardly and rearwardly of the V-shaped configuration at approximately a right angle to the respective diverging wings 12 and 14. As a result, the entire rearwardly inclined surface of the converging wings is presented into the earth at an acute angle with respect to the direction of travel of the plow. Manifestly, if the converging wings 30 are presented normally to the direction of travel of the plow, an extreme turbulence occurs, resulting in skipping over of parts of the earth being worked, as well as accumulation and irregular dumping of piles of reworked earth.

As illustrated in FIG. 3 converging wings 30, as well as the vertically extending shank 24 extend above substantially the entire lateral plane of attack of the plow and its diverging wings 12 and 14, thus insuring reworking of all earth turned by the plow. In the illustrated configuration wings 12, 14 and shank 24 respectively occupy approximately one-third of this lateral plane of attack. As particularly illustrated in FIG. 5, it is the presentation of the inclined surface substantially above the level of the top of the lifting surfaces 18 and 21 which insures the thorough reworking of plowed material. It has been found that a presentation of the converging wings beneath the level of attack of surfaces 18 and 21 results in an incomplete turning action with the danger of revitalization of grass and weeds in the earth being worked.

Manifestly, interchange of parts and reconfiguration thereof may be employed without departing from the spirit and scope of invention, as defined in the sub-joined claim.

I claim:

A shallow draft V-type plow comprising:

(A) two flat diverging wings having cutting edges lying in a horizontal plane of attack and being joined as a slightly curvilinear apex at their forward ends, said cutting edges defining in their diverging extensions an open V-configuration within said plane;

(B) a connecting shank fastening means extending from said curvilinear apex; and (C) converging mulch wings individually attached to, and extending inwardly from the free ends of said diverging wings and having their top and bottom edges substantially parallel to said horizontal plane defined by said cutting edges of said diverging wings, said mulch wings extending substantially above said horizontal plane of attack and rearwardly of said diverging wings, said mulch wings each further having a leading surface between said top and bottom edges that is inclined rearwardly in an upward direction with respect to the direction of travel of said plow and defines an acute angle with respect to said horizontal plane of attack.

References Cited in the file of this patent

UNITED STATES PATENTS

| | | |
|---|---|---|
| 296,732 | Craig | Apr. 15, 1884 |
| 308,163 | Hurel | Nov. 18, 1884 |
| 606,609 | Weed et al. | June 28, 1898 |
| 651,654 | Deterding | June 12, 1900 |
| 2,351,388 | Baxter | June 13, 1944 |
| 2,558,154 | Porter | June 26, 1951 |